United States Patent [19]

Kirschner et al.

[11] 3,835,785

[45] Sept. 17, 1974

[54] SWITCHING APPARATUS FOR TRANSPORTATION SYSTEM

[75] Inventors: Gerald D. Kirschner, Akron; William H. Woessner, Canton, both of Ohio

[73] Assignee: The Goodyear Tire and Rubber Company, Sunnit, Ohio

[22] Filed: Nov. 26, 1973

[21] Appl. No.: 418,926

[52] U.S. Cl. .............................................. 104/130
[51] Int. Cl. .......................................... E01b 26/00
[58] Field of Search ............. 104/130, 96, 102, 104, 104/105; 246/415 R, 415 A

[56] References Cited
UNITED STATES PATENTS

| | | | |
|---|---|---|---|
| 3,098,454 | 7/1963 | Maestrelli | 104/130 X |
| 3,310,004 | 3/1967 | Chadenson | 104/130 |
| 3,593,668 | 7/1971 | Adams | 104/130 |
| 3,783,793 | 1/1974 | Perrott et al. | 104/130 |

*Primary Examiner*—Lloyd L. King
*Assistant Examiner*—Randolph A. Reese
*Attorney, Agent, or Firm*—F. W. Brunner; R. P. Yaist; Frederick K. Lacher

[57] ABSTRACT

A switching apparatus for a vehicle steered by guide wheels in preloaded rolling engagement with guide rails at the sides of the vehicle path. Interconnected switch wheels at opposite sides of the vehicle are selectively directed into rolling engagement with switch rails extending along the sides of intersecting vehicle paths at the junction of the paths. A ramp on one side of the vehicle path is provided to urge the switch wheels under pressure into engagement with a switch rail on the opposite side of the vehicle. The ramp may be moved into and out of switching position by a locking toggle linkage to hold the switching position of the ramp when the ramp actuating power is off.

19 Claims, 10 Drawing Figures

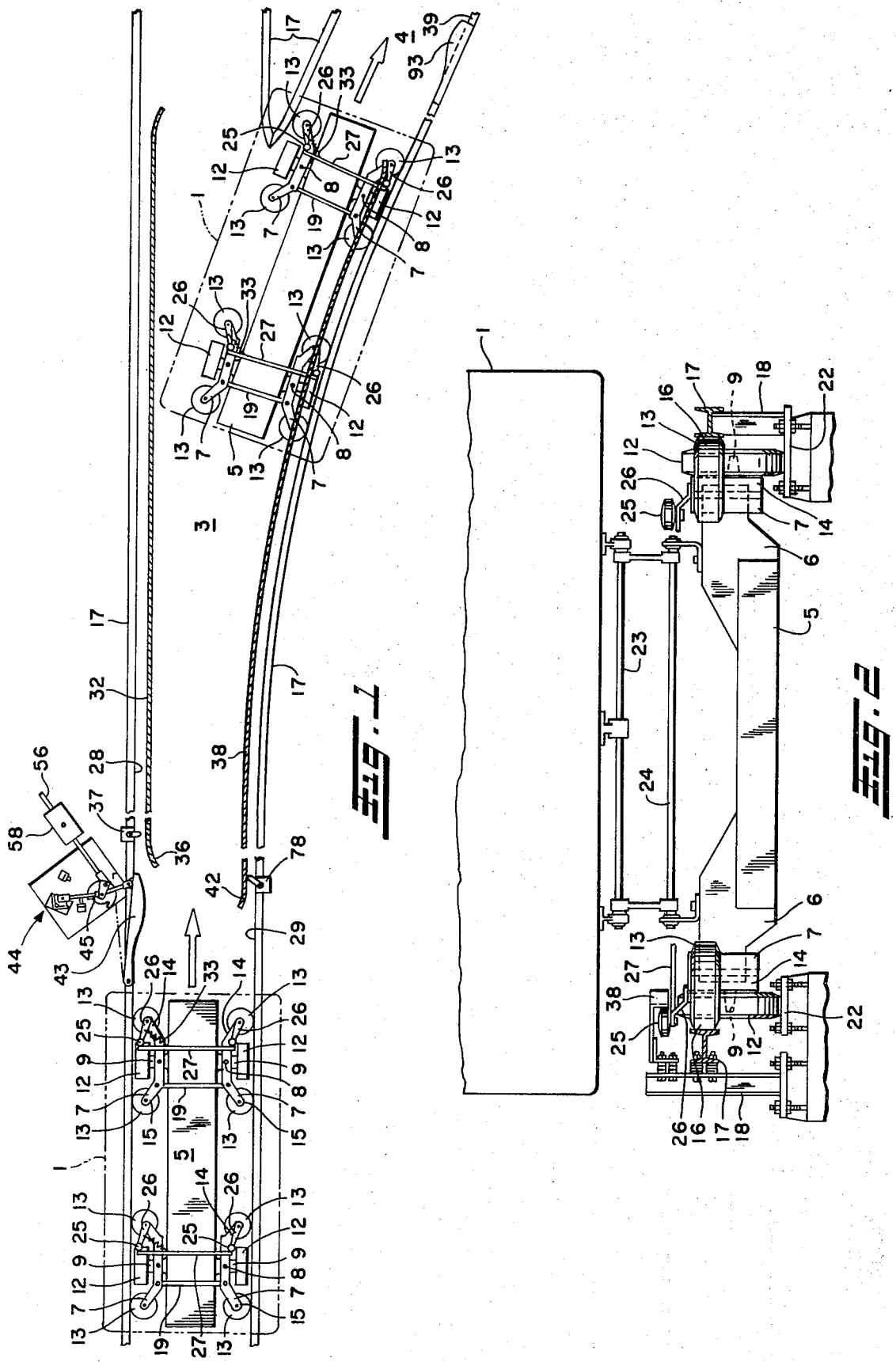

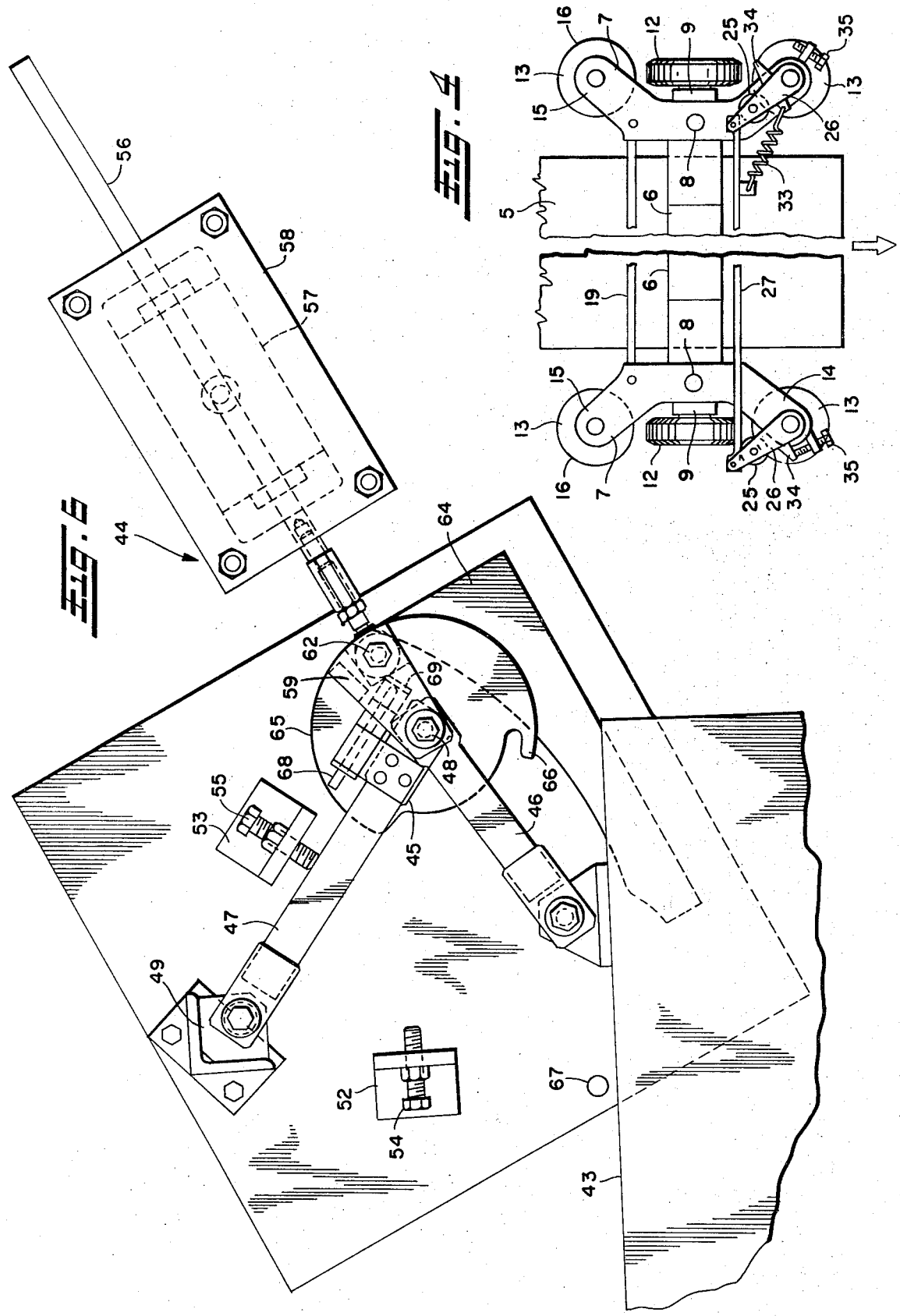

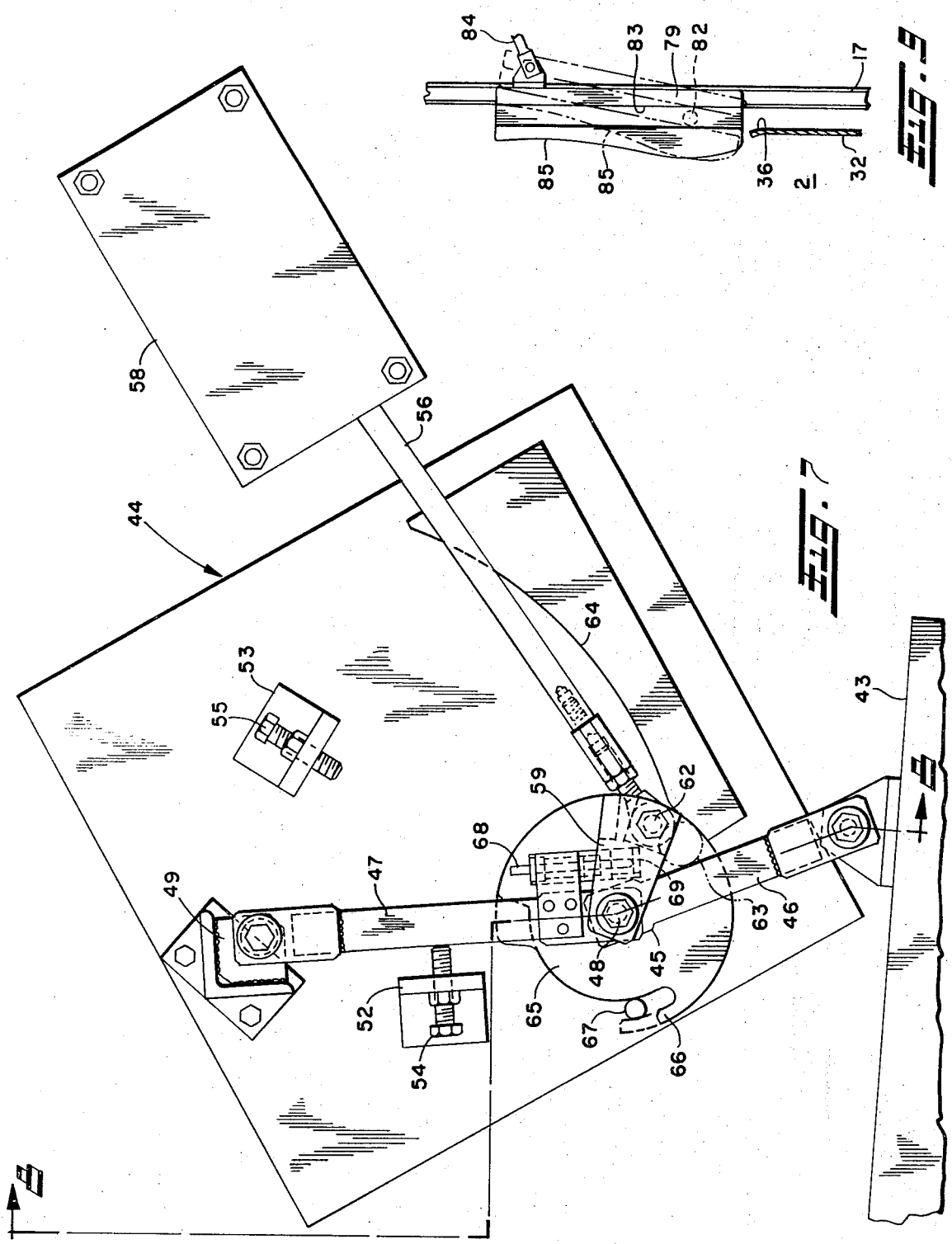

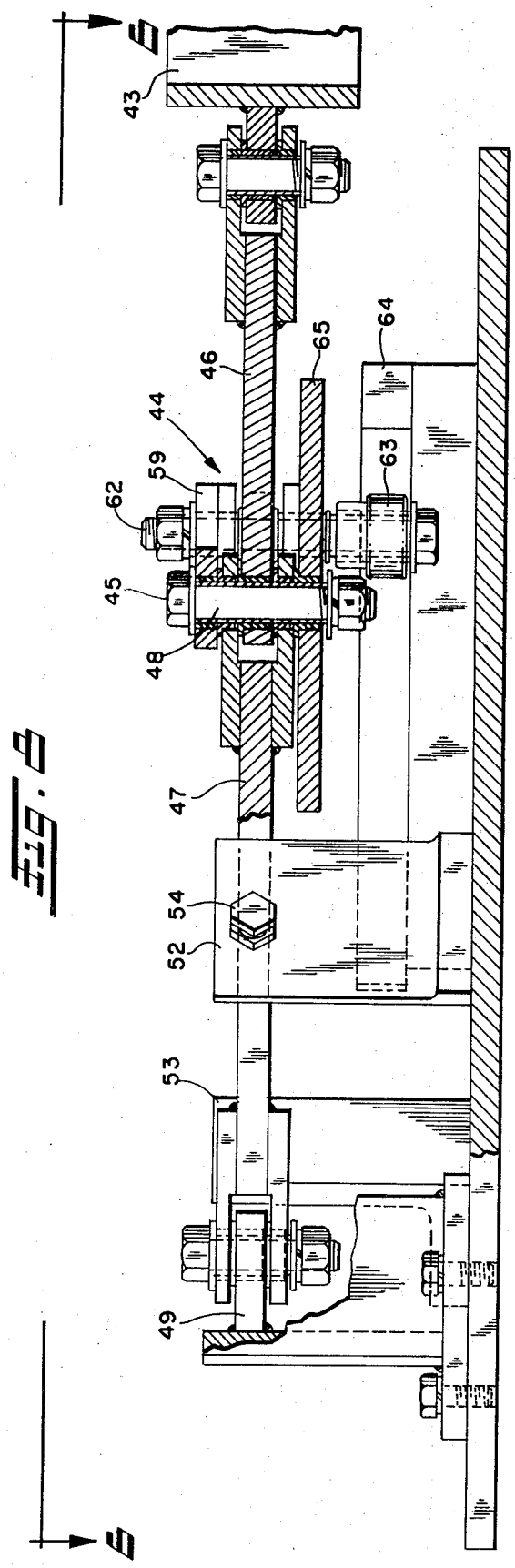
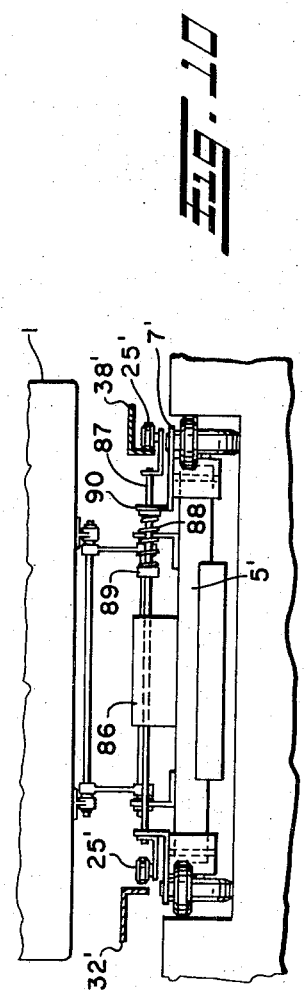

SWITCHING APPARATUS FOR TRANSPORTATION SYSTEM

This invention relates generally, as indicated, to the switching apparatus for vehicles in a conveyor system where it is necessary to direct the vehicles from movement along one path to the movement along a second path at a junction point. It is also necessary to provide for maintaining movement of the vehicle through the junction along the same path. The switching must be done in a positive manner with the least disturbance to the passengers or cargo being carried. Safety is also of great importance and accordingly the switching mechanism must operate positively and have safeguards for stopping the vehicles in the event of failure of the switching apparatus.

Heretofore, conveyor systems of the type shown and described for the present invention have utilized steering systems in which the wheels are turned by guide wheels engaging side guide rails. This steering arrangement is relatively simple and inexpensive; however, problems have been encountered at the junction of one path with another where it is important that the guide wheels be maintained at a preloaded pressure against the side guide rails. Where switch rails running alongside of the vehicle path have been used, problems have been encountered providing for engagement of the switch wheels with the switch rails in a smooth manner.

It is also desirable to actuate the switching mechanism from on or off the vehicle and heretofore no switching apparatus has met both these requirements.

With the foregoing in mind it is the principal object of this invention to provide a switching apparatus for a vehicle having guide wheels and side guide rails in which the guide wheel is held in preload condition against the guide rail at a junction by switch wheels on opposite sides of the vehicle engageable with switch rails selectively determined by movement of the switch wheels between a nonswitching and switching position.

A further object of the invention is to provide adjustable stop means for controlling the preloaded pressure of the guide wheel against the guide rail in the junction area.

Another object of the invention is to provide for connecting the switch wheels for simultaneous movement at both sides of the vehicle.

Still another object of the invention is to provide a ramp at one side of the vehicle path for engagement with one of the switch wheels to bias the switch wheels between the nonswitching and switching positions.

A further object of the invention is to provide a cam surface on the ramp for smooth engagement of the switch wheel with the switch rail.

A still further object of the invention is to provide a ramp with a straight guide wheel engaging surface leading into one of the switch rails for directing the switch wheel in the nonswitching position.

Another object of the invention is to provide a toggle linkage and locking mechanism for moving the ramp and holding it in the switching position.

Still another object of the invention is to provide for signal means ahead of the junction for contact by the switch wheel to indicate proper operation of the switching mechanism.

Another object of the invention is to provide onboard actuation for the switch wheels from the nonswitching to switching positions.

Still another object of the invention is to provide a fixed ramp in the side of the path joining another path for actuation of the switch wheels into the switching position as the vehicle merges with the other path.

To the accomplishment of the foregoing and related ends, the invention, then, comprises the features hereinafter fully described and particularly pointed out in the claims, the following description and the annexed drawings setting forth in detail a certain illustrative embodiment of the invention and modifications of certain parts, these being indicative, however, of but some of the various ways in which the principles may be employed.

In the annexed drawings:

FIG. 1 is a schematic plan view of a conveyor system showing vehicles in a junction area with the switching apparatus of the invention, parts being broken away.

FIG. 2 is an enlarged fragmentary end view of a vehicle and supporting structure in the switching position as shown in FIG. 1.

FIG. 4 is a schematic plan view like FIG. 3 showing the vehicle without the ramp of switch rails, parts being broken away.

FIG. 6 is an enlarged fragmentary view of the actuating mechanism for the ramp shown in FIG. 1 in the retracted position taken along the plane of line 6—6 of FIG. 8, parts being broken away.

FIG. 7 is a view like FIG. 6 showing the ramp mechanism in the extended position.

FIG. 8 is a sectional view taken along the planes of line 8—8 of FIG. 7, parts being broken away.

FIG. 9 is a fragmentary plan view of a modified form of the ramp shown in FIG. 1.

FIG. 10 is a view like FIG. 2 of a modification in which the switch wheels are actuated by onboard power means.

Figure 3:
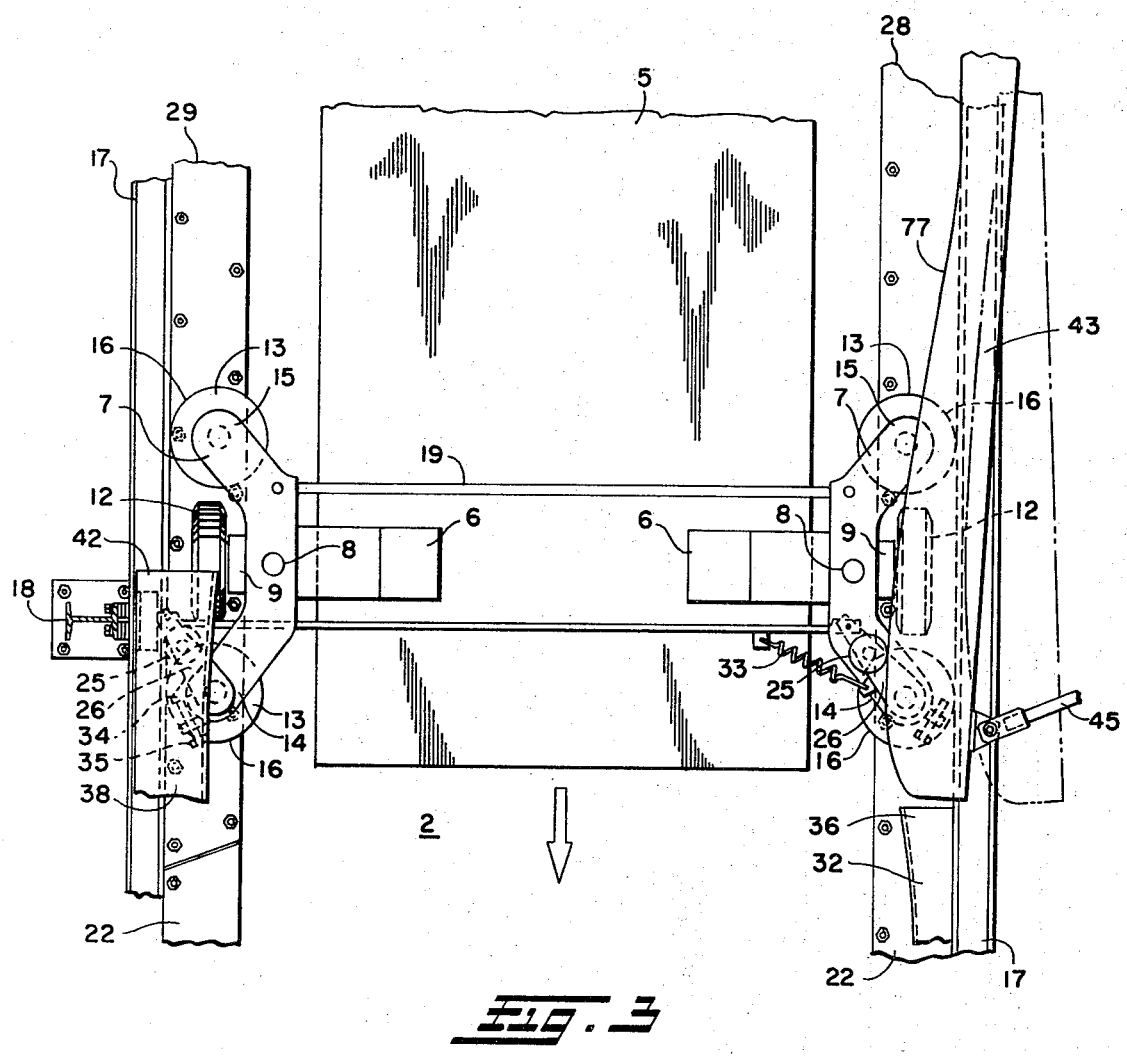
FIG. 3 is an enlarged fragmentary plan view like FIG. 1 showing the vehicle with the ramp in the switching position and in engagement with the switch wheel of one of the steering members.

Referring to FIG. 1, part of a conveyor system is shown in which a vehicle 1 is movable along a first path or main track 2 into a diverging junction 3 with a second path or spur track 4. The vehicle 1 has an undercarriage beam 5 which, in this embodiment, may also serve as a slider for a linear motor propulsion system. The beam 5 may be of aluminum and have axles 6 cast integrally with the beam at positions in the front and rear of the vehicle. Steering members such as yokes 7 are pivotally mounted on the axles 6 by king pins 8 extending vertically through the yokes and axles. Transversely extending spindles 9 on the yokes 7 rotatably support vehicle wheels 12 as shown more clearly in FIG. 2.

Steering control is provided by guide wheels 13 rotatably mounted at the forward and rear ends 14 and 15, respectively, of the yokes 7. Preferably the guide wheels 13 have resilient tires 16 which may be pneumatic or filled with plastic foam. The main track 2 and spur track 4 have guide rails 17 extending along the sides of the tracks for engagement by the guide wheels 13 in a preloaded condition with the preloaded pressure of the guide wheels against the guide rails being sufficient to prevent swinging of the yokes 7 as the vehicle 1 is moved between the guide rails. The guide rails 17 may be I-beams mounted on stanchions 18 along the sides of the main track 2 and spur track 4. The yokes 7 on opposite sides of the vehicle 1 may also be connected by tie rods 19 to provide the desired coordination of steering movement of the yokes, especially at curves and in the junction 3. The stanchions 18 are secured to the base of the main track 2 and spur track 4 which may also include track plates 22 on which the vehicle wheels 12 roll.

The body of the vehicle 1 may be mounted on the beam 5 by a suitable suspension such as a torsion bar apparatus including torsion bars 23, antisway tubes 24 and other ride cushioning and control suspension elements not shown.

At each of the forward ends 14 of yokes 7, a switch wheel 25 is rotatably mounted on an arm 26 pivotally connected to the yoke for swinging transverse movement of the switch wheel. The arm 26 on one side of the vehicle 1 is connected to the arm 26 on the other side of the vehicle by a connecting rod 27 so that when one switch wheel 25 is moved transversely the other switch wheel is simultaneously moved the same amount.

The main track 2 has a continuous side 28 where the guide rail 17 extends through the junction 3. At the opposite side of the main track the guide rail 17 extends into the spur track 4 resulting in an interrupted side 29 of the main track.

At the junction 3, a first switch rail 32 is mounted alongside the track on the continuous side 28 of the main track 2 for engagement with the switch wheel 25 on the continuous side of the track. The switch wheel 25 is resiliently held in a nonswitching position for engagement with the surface of the switch rail 32 by a spring 33 fastened to the arm 26 and connecting rod 27 as shown in FIG. 1.

The nonswitching position of the arm 26 is determined by stop means including a lug 34 mounted on the arm 26 and an adjusting screw 35 mounted on the forward ends 14 of yokes 7. By turning the adjusting screw 35 in the threaded connection with each of the forward ends 14 of the yokes 7, the position at which it engages the lug 34 is changed and therefore the position of the arm 26 and switch wheel 25 can be adjusted. Preferably, this adjustment is made so that there is sufficient pressure of the respective switch wheels 25 against the first switch rail 32 to maintain the preloaded pressure of the guide wheels 13 against the guide rails 17 as the vehicle moves through the junction 3. At the same time, the guide wheels 13 at the interrupted side 29 of the main track 2 move out of contact with the guide rail 17 at that side. In this way, the vehicle 1 is steered through the junction 3 without deviating from the direction determined by the guide rails 17 at the continuous side 28. Preferably the first switch rail 32 extends from a position a substantial distance ahead of the junction 3 to a position beyond the junction and in the present embodiment an entrance end 36 of the first switch rail 32 is about 50 feet from the junction 3. A limit switch 37 is mounted on the guide rail 17 near the entrance end 36 for engagement by the switch wheel 25 when the controls are set for the vehicle 1 to move past the junction 3 on the main track 2. If the limit switch 37 is not actuated in accordance with the programmed operation, the conveyor controls will be actuated to stop the vehicle 1 well ahead of the junction 3 in response to the failure of the limit switch to indicate movement of the switch wheel 25 along the first switch rail 32.

The first switch rail 32 may be mounted on stanchions 18 alongside the main track 2 and a second switch rail 38 may be mounted alongside the interrupted side 29 of the main track and extend into a side 39 of the spur track 4. The second switch rail 38 has an entrance end 42 at a substantial distance from the junction 3 and, as shown in FIG. 1, is further from the junction than the entrance end 36 of the first switch rail 32. This permits the switch wheel 25 on the interrupted side 29 of the main track 2 to be moved transversely into the switching position and into engagement with the side of the second switch rail 38. As shown in FIGS. 3 and 4, the switch wheel 25 has been moved transversely to the switching position with the lug 34 on the arm 26 in engagement with the adjusting screw 35 of the stop means. Here again, the screw 35 is adjusted so that the arm 26 can swing to a position in which the switch wheel 25 is pressed against the second switch rail 38 to provide for preloaded pressure of the guide wheels 13 against one of the guide rails 17 on the interrupted side 29 of the main track 2.

In the embodiment shown in FIGS. 1 through 8, the switch wheel 25 is moved to the switching position shown in FIGS. 3 and 4 by a ramp 43 pivotally mounted on the continuous side 28 of the main track 2 for swinging movement from a retracted position shown in chain-dotted lines in FIG. 3 to an extended position shown in solid lines. A switching mechanism 44 is positioned adjacent the ramp 43 with a toggle linkage 45 pivotally connected to one end of the ramp 43.

Referring in more detail to FIGS. 6, 7 and 8, the toggle linkage 45 has a ramp connecting link 46 and a swinging link 47 pivotally connected by a toggle link pin 48. One end of the swinging link 47 is pivotally mounted on a stationary bracket 49 for swinging movement into engagement with an out-stop 52, as shown in FIG. 7, and with an in-stop 53, as shown in FIG. 6. Screws 54 and 55 threaded in the out-stop 52 and in-stop 53, respectively, provide for adjusting the swinging movement of the swinging link 47 and in so doing, adjust the throw of the ramp 43.

The toggle linkage 45 is actuated by a power source moving actuating rod 56 between a retracted position shown in FIG. 6 and an extended position shown in FIG. 7. Suitable power means may be used and in this embodiment a linear induction motor 57, shown in dotted lines in FIG. 6, is pivotally mounted within a housing 58 for moving the rod 56. One end of the rod 56 is pivotally mounted on an arm 59 by an actuating pin 62 carrying a cam roller 63 for engagement with a plate cam 64 for guiding the movement of the toggle linkage 45 between the positions shown in FIG. 6 and FIG. 7.

After the toggle linkage 45 is extended to the out-stop position shown in FIG. 7, it is held there in a locked position by a rotatable locking plate 65 through which the toggle linkage pin 48 and actuating pin 62 pivotally extend. After the toggle linkage 45 is moved to the out-stop position as shown in FIG. 7, the actuating rod 56 continues to turn the arm 59 and locking plate 65 in a clockwise direction around the toggle linkage pin 48 to the position shown in dotted lines where hook 66 engages locking pin 67 preventing movement of the toggle linkage out of the out-stop position even though the motor 57 is not activated in any way.

To further insure that the locking plate 65 remains in position with the hook 66 over the locking pin 67, a spring-loaded plunger 68 is mounted on the swinging link 47 for engagement with a lug 69 on the locking plate 65. This plunger 68 further urges the locking plate 65 in a clockwise direction as shown in FIG. 7, to maintain the locked, no-power condition which is important to make sure that the ramp 43 is in the extended position for switching the vehicle 1.

Retraction of the actuating rod 56 compresses the spring-loaded plunger 68 and permits rotation of the locking plate 65 in the counterclockwise direction, as shown in FIG. 7, disengaging the hook 66 from the locking pin 67 and permitting movement of the arm 59 and the cam roller 63 along plate cam 64 into the retracted position shown in FIG. 6, with the swinging arm 47 against the in-stop 53.

In FIG. 1 a junction 3 is shown in which the vehicle 1 is switched into the spur track 4 by engagement of the switch wheel 25 on the interrupted side 29 with the second switch rail 38. The second switch rail 38 terminates after entrance of the vehicle 1 into the spur track 4 and the engagement of the guide wheels 13 on both sides of the vehicle with the guide rails 17 of the spur track.

Figure 5:
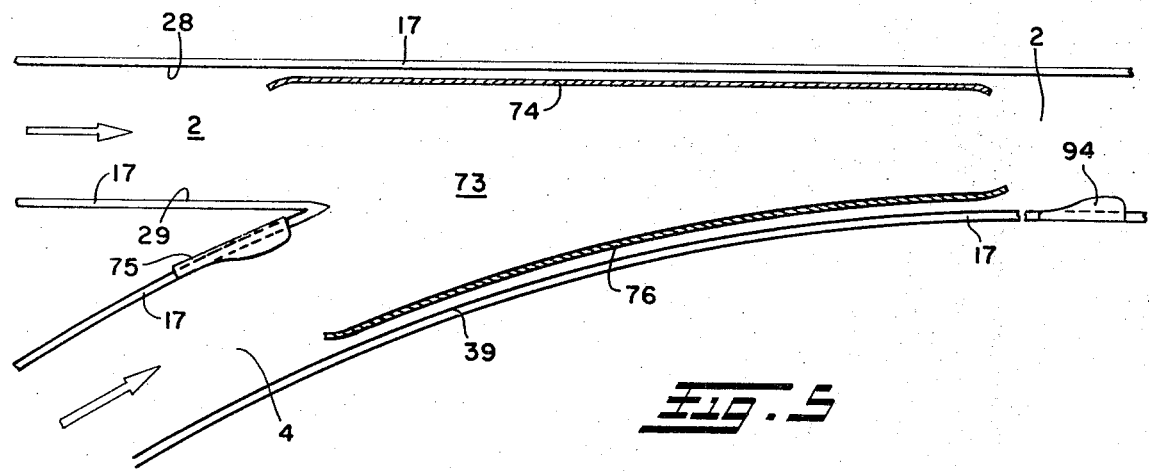
FIG. 5 is a schematic plan view of the conveyor system shown in FIG. 1 illustrating the junction where the side path joins the main path at a second junction area.

In FIG. 5 a converging junction 73 is shown in which the spur track 4 merges with the main track 2 and the vehicle move in the direction shown by the arrows. In the case of a vehicle 1 traveling on the main track 2, the switch wheel 25 is urged into engagement with a third switch rail 74 which acts in much the same way as switch rail 32 at the junction 3, shown in FIG. 1. In the case of a vehicle 1 traveling along the spur track 4, a stationary ramp 75 is mounted on the side of the spur track which terminates at the junction 73. On the opposite side of the spur track 4, a fourth switch rail 76 is provided for receiving the switch wheel 25 after it has been moved into the switching position by ramp 75 in a manner similar to that described for ramp 43 ahead of the converging junction 3, as shown in FIG. 1. Upon return of the vehicle 1 to the main track 2, the switch wheel 25 is released from the fourth switch rail 76 and the spring 33 moves the switch wheel 25 back into the nonswitching position with the guide wheels 13 in preloaded engagement with the guide rails 17 of the main track.

Referring to FIG. 3, the ramp 43 has a cam surface 77 with a gradual slope at the pivoted end for gradually moving the switch wheel 25 in a transverse direction. At the end of the ramp 43 towards the junction 3, the cam surface 77 is curved for a smooth movement of the switch wheel 25 into engagement with the second switch rail 38. This is important because of the preloaded pressure of the guide rail tires 16 against the guide rails 17 which makes it necessary to transfer the pressure loading exerted by the guide wheels 13 on the continuous side 28 of the main track to the second switch rail 38 without jerking the vehicle 1 sideways.

At the entrance end 42 of the second switch rail 38 a limit switch 78 may be provided for actuation by the switch wheel 25 at the interrupted side 29 of the main track 2. This limit switch 78 indicates whether the switch wheel 25 has been moved into the switching position and since the limit switch is a substantial distance from the junction 3, there is time to stop the vehicle 1 before it reaches the junction in a similar manner as explained heretofore for limit switch 37 on the other side of the track.

Referring to FIG. 9, a modified ramp 79 is shown which may be used to move the switch wheel 25 from the switching to nonswitching position. It also serves as an extension of the switch rail 32, shown in FIG. 1. The modified ramp 79 is pivoted at a pivot point 82 near the front of the ramp and has a slot 83 through which the switch wheel 25 may pass. In operation, an actuating lever 84 connected to the front end of the ramp 75 swings the ramp outward to the position shown in chain-dotted lines presenting a cam surface 85, for biasing the switch wheel from the nonswitching to a switching position similar to that shown in FIG. 3.

Another modification is shown in FIG. 10 in which the vehicle 1 has a switch wheel 25' engageable with a first switch rail 32' and a second switch rail 38'. A beam 5' supports an onboard actuating motor 86 which may be a linear induction motor for moving a switching rod 87 connected to a switch wheel 25' on each side of the vehicle for moving them from a nonswitching position to a switching position. The return of the switching rod 87 to the nonswitching position is provided by a spring 88 concentric with the switching rod 87 and interposed between a plate 89 mounted on the switching rod and a bracket 90 mounted on one of the yokes 7' of the vehicle. In operation, the switch wheel 25' remains in the nonswitching position with the spring 88 urging it in that direction for movement of the vehicle along the main track 2. When it is desired to switch the vehicle, the motor 86 is actuated which forces the switching rod 87 transversely from the nonswitching position to the switching position compressing the spring 88 and causing the switch wheel 25' to engage the second switch rail 38', as shown in FIG. 10.

As shown in FIG. 1, a stationary safety ramp 93 may be provided at a position along the side 39 of the spur track 4 beyond the second switch rail 38. In FIG. 5, a stationary safety ramp 94 may be provided at a position along the interrupted side 29 of the main track beyond the fourth switch rail 76. These safety ramps 93 and 94 may be positioned anywhere along the tracks 2 and 4 before the next switching area. The safety ramps 93 and 94 engage the switch wheel 25' to positively return the switching rod 87' to the nonswitching position in the event the spring 88 does not function because of binding of the linkage.

In the description of the preferred embodiments, the switch wheels 25 and 25' are shown and described in a normal nonswitching position. If desired, the mechanism can be reversed with the mechanism in a normal switching position in which case the ramp 43, shown in FIG. 1, would be on the opposite side of the track for actuating the switch wheels 25 to a nonswitching position if the vehicle 1 is to be directed through the junction 3 and continue along the main track. If the ramp was not actuated, the vehicle 1 would automatically follow the side 39 of spur track 4.

While certain representative embodiments and details have been shown for the purpose of illustrating the invention, it will be apparent to those skilled in the art that various changes and modifications may be made therein without departing from the spirit or scope of the invention.

We, therefore, particularly point out and claim as our invention:

1. A switching apparatus for a vehicle movable along a first path having a junction with a second path comprising steering members pivotally mounted on opposite sides of said vehicle, guide wheels mounted on said steering members, a guide rail on each side of said first path and said second path for engagement by said guide wheels in a preloaded condition, a first switch rail extending along a continuous side of said first path at said junction, a second switch rail extending along an interrupted side of said first path and along a side of said second path at said junction, each of said steering members having a switch wheel mounted for simultaneous transverse movement with a switch wheel mounted on a steering member at the opposite side of said vehicle, switch means for moving said switch wheel in the transverse direction between a switching position and a nonswitching position, said switch wheel on said continuous side being engageable with said first switch rail in said nonswitching position, stop means limiting transverse movement of said switch wheel on said continuous side in said nonswitching position whereby said first switch rail biases said switch wheel towards said guide rail to maintain the preloaded pressure of said guide wheel against said guide rail at said continuous side in said junction, said switch wheel on said interrupted side of said first path being engageable with said second switch rail in said switching position, and stop means limiting transverse movement of said switch wheel on said interrupted side in said switching position whereby said second switch rail biases said switch wheel towards said guide rail to maintain the preloaded pressure of said guide wheels against said guide rail at said interrupted side in said junction.

2. The switching apparatus of claim 1 wherein said stop means are adjustable to control the preloaded pressure exerted by said guide wheel against said guide rail in said junction.

3. The switching apparatus of claim 1 wherein said switch wheel on said continuous side of said first path is connected to said switch wheel on said interrupted side by a connecting rod for simultaneous movement of the switch wheels.

4. The switching apparatus of claim 3 wherein said switch wheel is mounted on an arm pivotally connected to said steering member.

5. The switching apparatus of claim 3 wherein said switch means includes a ramp at said continuous side of said first path engageable with said switch wheel to bias said switch wheel on said interrupted side into engagement with said second switch rail at said vehicle travels from said first path into said second path.

6. The switching apparatus of claim 5 wherein said switching apparatus further comprises spring means for retaining said switch wheel in said nonswitching position and returning it from said switching position to said nonswitching position.

7. The switching apparatus of claim 5 wherein said ramp has a cam surface for engagement with said switch wheel and said cam surface being curved to bias said switch wheel on said interrupted side of said first path a greater distance than is required to engage said second switch rail and thereafter smoothly guide said switch wheel into engagement with said second switch rail.

8. The switching apparatus of claim 7 wherein said ramp is pivotally mounted for swinging movement toward said interrupted side of said first path into position for engagement with said switch wheel.

9. The switching apparatus of claim 8 wherein said ramp has a straight guide wheel engaging surface on the opposite side of said cam surface and said straight guide wheel engaging surface is in alignment with said first switch rail.

10. The switching apparatus of claim 8 wherein said ramp is connected to power means by toggle linkage means and out-stop means engageable by said toggle linkage means whereby said movement of said ramp into position for engagement with said switch wheel on said continuous side of said first path is stopped with said toggle linkage means in an over-center condition.

11. The switching apparatus of claim 10 wherein said linkage means includes a locking means movable into locking condition after said toggle linkage is in engagement with said out stop.

12. The switching apparatus of claim 11 wherein said locking means includes a rotatable locking plate for rotation into a locked position after said toggle is in engagement with said out stop.

13. The switching apparatus of claim 12 wherein spring means are interposed between said linkage means and said locking plate to rotate said locking plate after said toggle linkage is in engagement with said out stop.

14. The switching apparatus of claim 3 wherein said second path has a second side opposite said side with said second switch rail, said switch means further comprising a ramp at said second side engageable with said switch wheel to bias said switch wheel on said interrupted side of said first path into engagement with said second switch rail as said vehicle travels from said second path through said junction into said first path.

15. The switching apparatus of claim 3 wherein a safety ramp is mounted for engagement with said switch wheel at a position beyond said junction for positively returning said switch wheel from said switching position to said nonswitching position.

16. The switching apparatus of claim 1 wherein said second switch rail has an entrance portion for receiving said switch wheel, said entrance portion being positioned at a location spaced a substantial distance from said junction and signal means between said entrance portion and said junction responsive to the passage of said switch wheel over said second switch rail.

17. The switching apparatus of claim 1 wherein said switch means is mounted on said vehicle in driving relationship with said switch wheel.

18. The switching apparatus of claim 1 wherein said guide wheels have resilient tires for deflection under said preloaded pressure.

19. The switching apparatus of claim 1 wherein said first switch rail has an entrance portion for receiving said switch wheel and signal means in said entrance portion responsive to the passage of said switch wheel over said first switch rail.

* * * * *